US012801410B2

(12) United States Patent
Waterman

(10) Patent No.: US 12,801,410 B2
(45) Date of Patent: Nov. 17, 2026

(54) GRAPHICAL USER INTERFACES

(71) Applicant: NCR Voyix Corporation, Atlanta, GA (US)

(72) Inventor: Simon Richard Waterman, Somerset (GB)

(73) Assignee: NCR Voyix Corporation, Atlanta, GA (US)

( * ) Notice: Subject to any disclaimer, the term of this patent is extended or adjusted under 35 U.S.C. 154(b) by 190 days.

(21) Appl. No.: 18/129,162

(22) Filed: Mar. 31, 2023

(65) Prior Publication Data

US 2024/0330025 A1 Oct. 3, 2024

(51) Int. Cl.

*G06F 9/451* (2018.01)
*G06Q 20/18* (2012.01)
*G06Q 20/20* (2012.01)

(52) U.S. Cl.

CPC ............ *G06F 9/452* (2018.02); *G06Q 20/18* (2013.01); *G06Q 20/20* (2013.01)

(58) Field of Classification Search

None

See application file for complete search history.

(56) References Cited

U.S. PATENT DOCUMENTS

| | | | | |
|---|---|---|---|---|
| 9,448,815 | B2 * | 9/2016 | Pahlavan | G06F 9/452 |
| 2005/0283757 | A1 * | 12/2005 | Fleming | G06F 9/451 717/113 |
| 2017/0339250 | A1 | 11/2017 | Momchilov et al. | |
| 2021/0318889 | A1 * | 10/2021 | Waterman | G06F 13/4072 |
| 2024/0095006 | A1 | 3/2024 | Waterman | |

FOREIGN PATENT DOCUMENTS

| | | | | |
|---|---|---|---|---|
| WO | WO-2022178076 | A1 * | 8/2022 | H04N 24/8456 |

OTHER PUBLICATIONS

Extended European Search Report for corresponding European Patent Application No. 24182088.5 dated Nov. 28, 2024.

* cited by examiner

*Primary Examiner* — Tuan S Nguyen

(74) *Attorney, Agent, or Firm* — Notaro, Michalos & Zaccaria P.C.; John S. Economou

(57) ABSTRACT

A method, a computing system, and a computer program are disclosed. The method includes providing a first executable image file that includes first executable software associated with a graphical user interface application, executing the first executable image file as a first software container element that contains the first executable software and that is executable on one or more processors of a server that is remote from a computing device, transmitting display data associated with a graphical user interface to the computing device responsive to executing the first executable image file, and providing the graphical user interface on a display of the computing device.

18 Claims, 8 Drawing Sheets

600

GRAPHICAL USER INTERFACES

FIELD OF THE INVENTION

The present invention relates to methods and computing devices for providing a graphical user interface on a display of a computing device. More particularly, but not exclusively, the present invention relates to a methodology for providing, via software containers, the graphical user interface of retail applications on a self-service terminal by transmitting display data from a server.

BACKGROUND

It is known that self-service terminals (SSTs) and/or Point of Sale (POS) terminals and/or kiosks are used from time to time in the retail industry. SSTs, POS terminals and kiosks are typically used to enable a customer to conduct transactions with a retail establishment. Each SST, POS terminal or kiosk in any retail establishment may be connected to different peripheral devices. Each SST, POS terminal or kiosk may also execute different software, such as having different underlying operating systems (Linux, Windows etc.) and different software applications. This is typically dependent upon the retail establishment where the SST, POS terminal or kiosk is used, and the intended use of the SST, POS terminal or kiosk in the retail establishment. From time to time, the software executing on the SST, POS terminal or kiosk may also be upgraded or the connected peripheral devices may change. It will also be appreciated that each SST, POS terminal or kiosk may also render a specific graphical user interface (GUI) or a series of different GUIs according to the needs of the terminal/kiosk.

Due to the variations that are often present from terminal to terminal, software developers have started making use of software containers that contain the software that needs to be executed on terminals. Software containers isolate the running software thus helping to avoid complex platform dependencies. That is to say that a software container is able to execute on one or more processors of a terminal independent of the computing environment of that terminal because the container includes all of the software (application code as well as any software dependencies) it needs to be executable in any computing environment. Additionally, because containers operate in their own isolated computing environment (except for certain predefined communication pathways with other software/hardware such as access to specific files, specific ports, etc. outside the software container), they are also particularly secure. Software containers are thus an effective way of packaging and distributing software for use on terminals and kiosks. Moreover, when a software or hardware upgrade is performed on a terminal, a new software container can be executed on the terminal that accounts for these upgrades. Also, since containers can be pre-built, complex builds on every terminal can be avoided. It is noted that software containers differ from virtual machines in various ways. For example, unlike virtual machines, containers do not require a hypervisor to be installed on the computing device. Software containers are also typically more lightweight and run faster than virtual machines. Furthermore, whereas virtual machines virtualize hardware to enable operating systems to run on the virtualized hardware, software containers generally virtualize at the operating system level, thereby enabling multiple containers to independently execute their respective applications/processes while sharing the kernel, binaries, libraries, etc. of a single host operating system.

SUMMARY

Example embodiments of the present invention provide a graphical user interface on a terminal, such as a self-service terminal or point of sale terminal or kiosk.

Example embodiments of the present invention provide a graphical user interface on a terminal by providing data from a remote server that creates a virtual GUI and transmits data associated with the virtual GUI to the terminal.

Example embodiments of the present invention use software containers to help enable more graphical user interface applications to be executed on a set of server hardware resources and thus to provide more GUIs to more terminals than would be possible if using virtual machines on those same server hardware resources.

Example embodiments of the present invention help provide ultra-lightweight terminals with just enough resources to support VDI software, thus resulting in reduced costs of the terminals.

Example embodiments of the present invention help avoid the need for virtualisation infrastructure on a server. This can reduce the size of the server hardware, resulting in reduced use of resources and costs.

Example embodiments of the present invention help reduce the complexity of deploying graphical user interface components for retail applications in a virtual store environment.

Example embodiments of the present invention provide a graphical user interface on a self-service terminal by providing display data from a software container executing on a server, where the software container does not need privileged access. This helps to ensure strong security of the system is maintained.

According to an aspect of the present invention, there is provided a computer-implemented method for providing a graphical user interface on a display of a computing device, comprising the steps of: providing a first executable image file comprising first executable software associated with a graphical user interface application; executing the first executable image file as a first software container element that contains the first executable software and that is executable on one or more processors of a server that is remote from a computing device; responsive to executing the first executable image file, transmitting display data associated with a graphical user interface to the computing device; and responsive to said transmitting, providing the graphical user interface on a display of the computing device.

Aptly, in another aspect of the present invention, the method further comprises: providing a second executable image file comprising second executable software associated with graphical user interface infrastructure components that support the graphical user interface application; and executing the second executable image file as a second software container element that contains the second executable software and that is executable on said one or more processors of the server.

Aptly, in another aspect of the present invention, the method further comprises: responsive to executing the first executable image file, providing display instructions from the first software container element to a display buffer associated with the second software container element; responsive to providing the display instructions, storing the display data in the display buffer; and transmitting the display data to the computing device.

Aptly, in another aspect of the present invention, the method further comprises: transmitting the display data to a graphical processing unit located on the computing device; and responsive to the graphical processing unit processing the display data, providing the graphical user interface on the display.

Aptly, in another aspect of the present invention, the method further comprises: transmitting the display data to the computing device via a remote desktop protocol, optionally an RDP or VNC or SPICE protocol.

Aptly, in another aspect of the present invention, the method further comprises: providing the first executable image file as an image file that comprises executable software associated with the graphical user interface application and one or more graphical user interface toolkits.

Aptly, in another aspect of the present invention, the method further comprises: providing the second executable image file comprises providing the second executable image file as an image file that comprises executable software associated with a display server, whereby the display server is configured to receive and send display instructions to a display buffer.

Aptly, in another aspect of the present invention, the method further comprises: providing the second executable image file comprises providing the second executable image file as an image file that comprises executable software associated with a remote desktop protocol server, whereby the remote desktop protocol server is configured to transmit display data to the computing device and/or receive data associated with inputs from one or more user input devices connected to the computing device.

Aptly, in another aspect of the present invention, the method further comprises: providing the second executable image file comprises providing the second executable image file as an image file that comprises executable software associated with a user interface input manager, whereby the user interface input manager is configured to process inputs received from one or more user input devices connected to the computing device.

Aptly, in another aspect of the present invention, the method further comprises: providing a plurality of first executable image files each comprising respective first executable software associated with a respective graphical user interface application; executing each of the plurality of first executable image files as a plurality of respective first software container elements that respectively contain the respective first executable software and that are executable on said one or more processors of the server that is remote from a plurality of computing devices; responsive to executing the respective first executable image files, transmitting respective display data associated with a respective graphical user interface to each respective computing device of the plurality of computing devices; and responsive to said transmitting, providing the respective graphical user interface on each respective display of each respective computing device.

Aptly, in another aspect of the present invention, the method further comprises: providing a plurality of second executable image files each comprising respective second executable software associated with respective graphical user interface infrastructure components that supports a respective graphical user interface application; and executing each of the plurality of the respective second executable image files as respective second software container elements that respectively contain the respective second executable software and that are executable on said one or more processors of the server.

Aptly, in another aspect of the present invention, the method further comprises: providing a third executable image file comprising third executable software configured to re-route data received from one or more user input devices connected to the computing device; and executing the third executable image file as a third software container element that contains the third executable software and that is executable on one or more processors of the computing device.

Aptly, in another aspect of the present invention, the method further comprises: via the third software container element, re-routing data received from said user input devices to the server, wherein optionally the user input devices are peripheral devices connected to the computing device via a USB or serial connection.

Aptly, in another aspect of the present invention, the method further comprises: receiving the re-routed data at the second software container element; transmitting said re-routed data from the second software container element to the first software container element; and responsive to said transmitting the re-routed data, providing updated display instructions from the first software container element to the second software container element to cause the graphical user interface to be updated.

Aptly, in another aspect of the present invention, the method further comprises: re-routing the data received from said user input devices via a remote desktop protocol, optionally an RDP or VNC or SPICE protocol.

Aptly, in another aspect of the present invention, the method further comprises: providing a fourth executable image file comprising fourth executable software for communicating with one of more user input devices connected to the computing device; and executing the fourth executable image file as a fourth software container element that contains the fourth executable software and that is executable on said one or more processors of the server.

Aptly, in another aspect of the present invention, the method further comprises: via the fourth software container element, receiving re-routed data from one or more user input devices connected to the computing device, wherein optionally the user input devices are peripheral devices connected to the computing device via a USB or serial connection.

According to another aspect of the present invention, there is provided a computing system comprising at least one computing device comprising a display for providing a graphical user interface and a server remote from the computing device, the server comprising one or more processors configured to: execute a first executable image file, comprising first executable software associated with a graphical user interface application, as a first software container element that contains the first executable software; and responsive to execution of the first executable image file, transmit display data associated with a graphical user interface to the computing device; wherein the computing device comprises one or more processors configured to: receive the display data from the server; and process the display data to thereby provide the graphical user interface on the display of the computing device.

Aptly, in another aspect of the present invention, the computing system as claimed in claim 18, wherein the computing device is a point of sale terminal or self-service terminal or kiosk.

According to another aspect of the present invention, there is provided a computer program comprising instructions which, when executed by at least one computing device, cause the computing device to carry out the steps of the method of the first aspect of the present invention.

Certain embodiments of the present invention provide a graphical user interface application, running within a software container element on a server, that results in a graphical user interface being displayed on a remote terminal.

Certain embodiments of the present invention help enable more graphical user interface applications to be run on a single server than would be possible if using virtual machines. This greater density of workloads is enabled by executing the graphical user interface applications within software container elements.

Certain embodiments of the present invention help avoid the need for supporting and maintaining virtualisation infrastructure associated with virtual machines.

Certain embodiments of the present invention help provide a virtual frame buffer on a remote server that stores display data that is transmitted to a terminal for providing a graphical user interface thereon.

Certain embodiments of the present invention help provide a methodology for handling the re-routing of data received from peripheral devices connected to a terminal to a software container element running on a server, such as a software container element that runs a graphical user interface application.

Certain embodiments of the present invention help reduce the cost and complexity of providing thin-client terminals that are connected to a remote server and that are provided with their graphical user interface data from the remote server.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1:
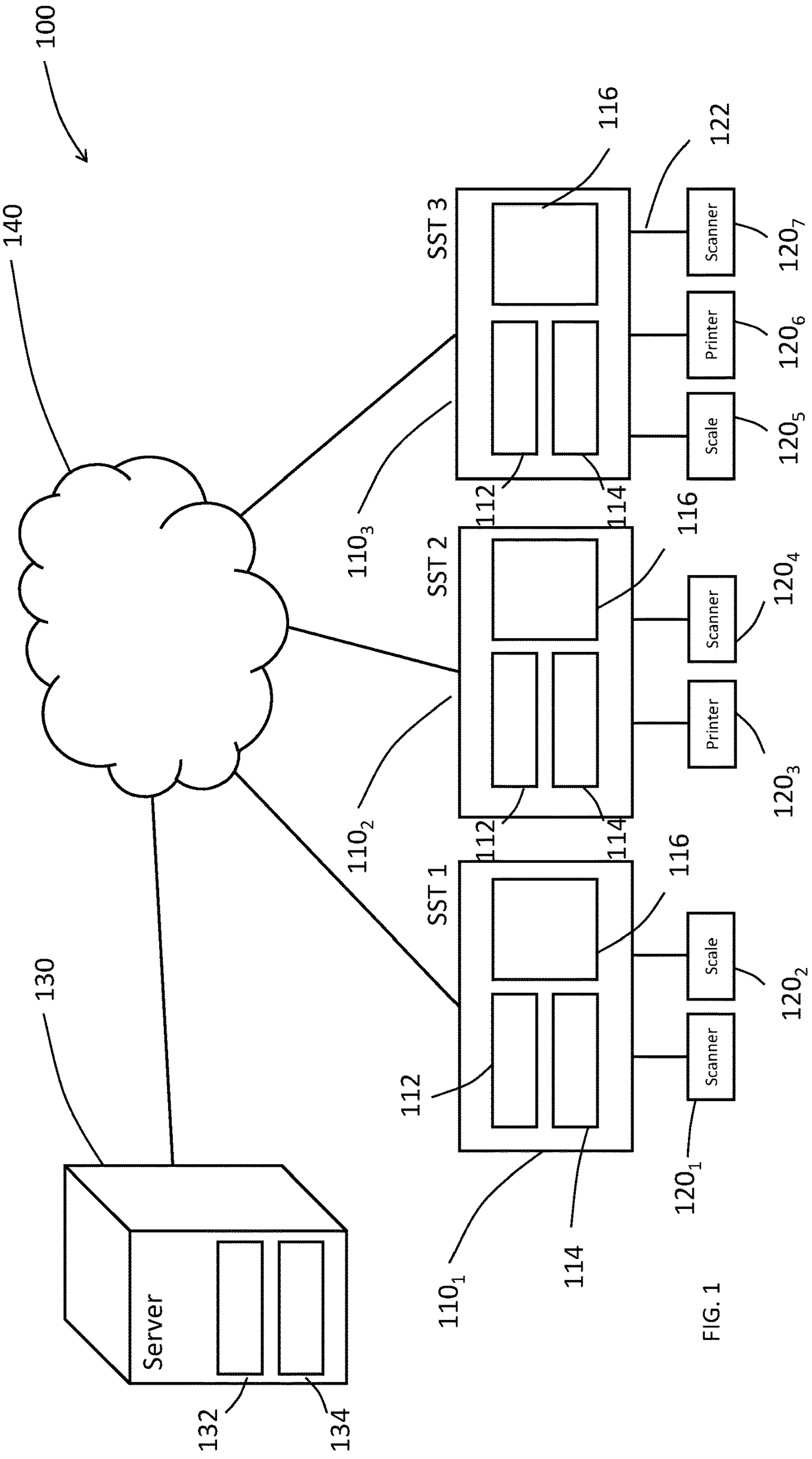
FIG. 1 illustrates a computing system.

When deploying a software container, a container engine (such as docker, RKT, CRI-O, and LXD or the like) may be utilized. The container engine can perform various functions including, but not limited to, accepting user requests or requests from an application programming interface (API) server of a container orchestrator (such as Kubernetes, Swarm, Mesos, or the like); pulling image files (e.g., in a particular image format) from a registry; preparing a container mount point; preparing metadata that is needed to execute a software container; and calling a container runtime. The container runtime is a part of the container engine. The container runtime (such as runc, containerd, crun, railcar, katacontainers, or the like) uses the mount point and the metadata provided by the container engine and communicates with the kernel (of a host OS) running on the computing device in order to execute a container image file and thereby create a software container.

When implementing multiple containers across multiple computing devices, a software container orchestrator platform may be used. These platforms are able to schedule container workloads across multiple computing devices (e.g., SSTs, POS terminals or kiosks) and are also able to provide a standardized application definition file (e.g., kube YAML, docker compose, or the like). Kubernetes is an example of a container orchestration platform.

A Kubernetes container orchestration platform is a cluster of units, including a controlling unit called the Kubernetes master, which manages the cluster, and at least one node (or worker) which runs workloads (containers). One part of the Kubernetes orchestrator platform is the kubelet. The kubelet is an agent that runs on every worker which is part of the Kubernetes system. During operation, the kubelet receives commands (e.g., from an API server on a Kubernetes master) that informs the kubelet what container(s) should be running on a computing device. In Kubernetes, these containers are provided within "pods". Typically, a single pod includes a single container although it is possible to include multiple containers within a given pod. The kubelet passes—to a container engine (e.g., via a Container Runtime Interface (CRI))-information regarding what container(s) should be running on a computing device to enable execution of a software container via a container runtime within the container engine.

A software container is created when a container runtime executes an executable container image file. As such, a software container is essentially a runtime instance of an associated executable container image file. In this sense, an executable container image file is an image file that has all of the software it needs to at least be executable as a software container element. In more detail, a container image file is typically a binary file that includes all the necessary requirements for running a software container as well as any metadata describing needs and capabilities of the software container. The container image file itself may be made up of several layers that define the executable instructions needed for running the software container. For example, a container image file may include one or more layers which define a software application(s) executable code, one or more layers defining code for any software dependencies upon which the software application(s) rely, and one or more layers defining code for any required configuration settings. Container image files are often stored in a container image registry. Each container image file is stored in a particular container image format that defines the layers and metadata within a container image file. For example, the Open Container Initiative (OCI) image format defines the image file as tar files for each layer and a manifest file in JavaScript Object Notation (JSON) format which specifies the metadata associated with the image file.

To date, however, the use of containers has been completely overlooked when running GUI applications as part of a microservices architecture. Unlike the supporting microservices, the GUI components are typically deployed using traditional techniques onto bare-metal or sometimes inside a virtual machine. Where attempts have been made to isolate GUI applications inside a sandbox, such as Flatpak, AppImage or Snap, the approaches taken suffer from various limitations. For example, they do not provide full sandbox isolation for most applications, thereby leaving the applications open to security vulnerabilities. They also require special sandboxing technology which often is not compatible with the backend microservices. In addition, may be difficult to update.

Virtual machines are sometimes used in the microservices architecture. Through virtual machines, it is possible to run GUI components on a central computing device such as a server and broadcast display data to a different physical computer. This reduces the hardware requirements for the physical computer displaying the GUI components because much of the processing related to displaying GUI components is executed on the central computing device. However, there are disadvantages associated with using virtual machines. For example, in a retail environment, there is a need to run one virtual machine for each SST or POS terminal or kiosk in a store (the terminals may be thin-clients). Each virtual machine has an overhead that constrains how many terminals can be supported on a particular model of server hardware. This ultimately means more hardware is required. Requiring more hardware, however, results in increased use of resources and costs. Virtual machines also require virtualization infrastructure, and consequently, there is a need to support and maintain virtualization infrastructure and the virtual machines themselves, which can be complex and expensive. Furthermore, where non-GUI applications have already been fully containerized, it is wasteful of resources to require a virtual machine for each terminal simply to run GUI applications.

FIG. 1 illustrates a computing system 100. In the computing system 100, there are three self-service terminals (SSTs) 110$_1$, 110$_2$, 110$_3$. The SSTs are an example of a computing device. In certain other embodiments of the present invention, the computing device may be a Point of Sale (POS) terminal, a kiosk, an Automated Teller Machine (ATM), a personal computer, a laptop, a tablet or the like. Each SST includes one or more processors 112, at least one memory 114 and a display 116. The memory is a non-transitory computer-readable storage medium. The memory 114 stores executable software that is executable by the processors 112 of the SST. The displays 116 display a graphical user interface (GUI). Each SST may also include a communication interface (not shown) for communicating with a server and one or more communication interfaces (not shown) for communicating with connected peripheral devices.

In the system illustrated in FIG. 1, a scanner peripheral device 120$_1$ and a scale peripheral device 120$_2$ are connected to the first SST 110$_1$. Also, a printer peripheral device 120$_3$ and a scanner peripheral device 120$_4$ are connected to the second SST 110$_2$. Also, a scale peripheral device 120$_5$, printer peripheral device 120$_6$ and scanner peripheral device 120$_7$ are connected to the third SST 110$_3$. It will be appreciated in certain other embodiments of the present invention, each SST may be connected to different combinations of peripheral devices. Each peripheral device may communicate with the SST it is connected to via a wired interface 122. It will be appreciated that in certain other embodiments of the present invention the interface may be wireless or a combination of wired and wireless. Each SST communicates with a server 130 via a network 140. The server is also an example of a computing device. The network 140 may be wired, wireless or a combination of wired and wireless. The server 130 also includes one or more processors 132 and at least one memory 134. The memory 134 is also a non-transitory computer readable storage medium. The memory 134 stores executable software that is executable by the processors of the server. The executable software of the SSTs and the server will be described in more detail below.

Figure 2:
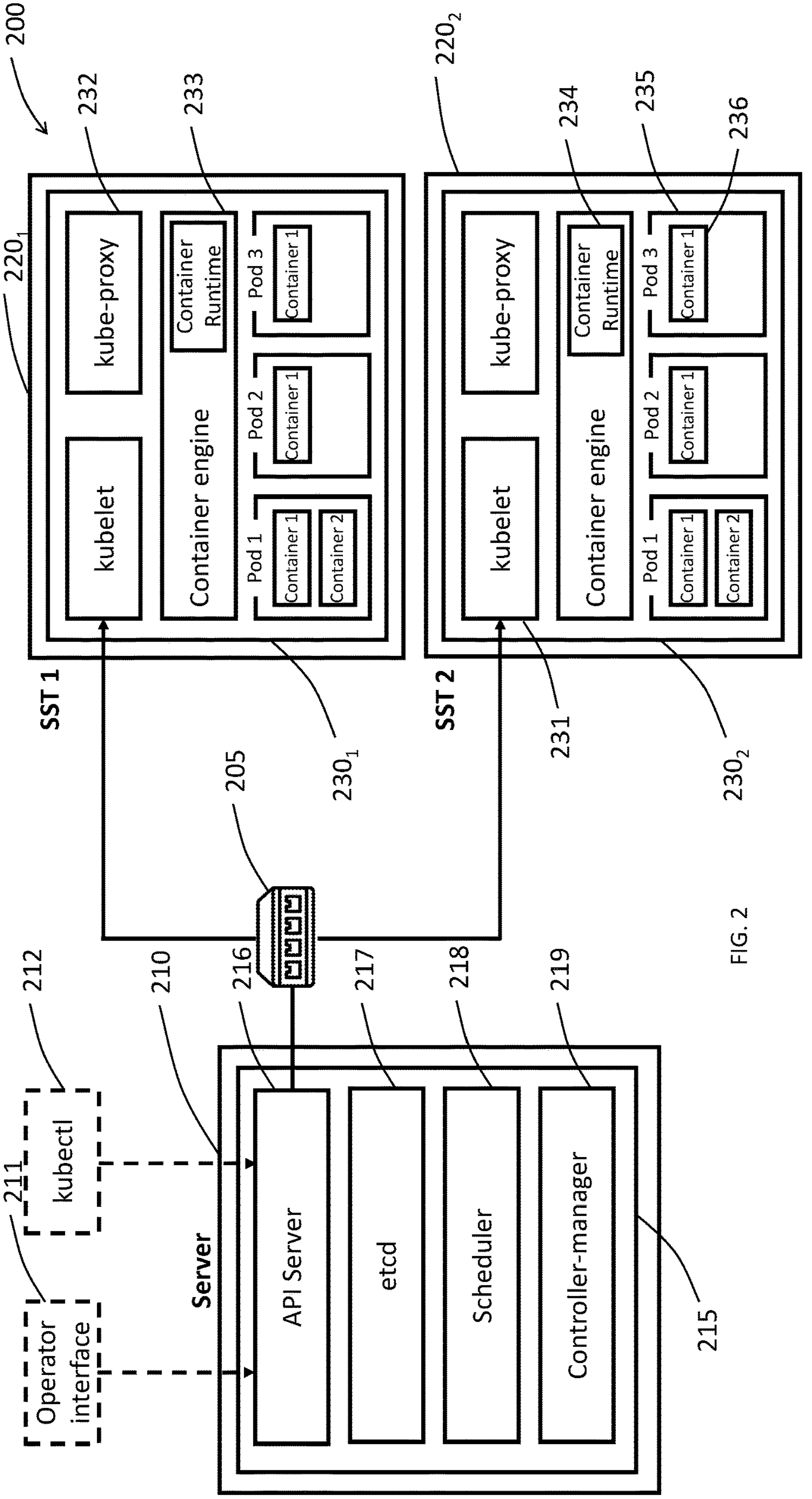
FIG. 2 illustrates a computing system under the control of a Kubernetes orchestration platform.

FIG. 2 illustrates a computing system 200. The computing system has several components under the control of a Kubernetes container orchestration platform. As such, the system may be referred to as a Kubernetes cluster. The Kubernetes cluster includes a server 210, on which a Kubernetes master 215 runs, and self-service terminals (SSTs) 220$_1$, 220$_2$, on which respective Kubernetes workers 230$_1$, 230$_2$ run (generically referred to herein at times as worker 230). It will be appreciated that the server 210 may be located within a same physical environment as the SSTs 220$_1$, 220$_2$ or may be a cloud server. The server 210 and the SSTs communicate over a network 205 such as a local area network or the Internet. The network 205 may be wired and/or wireless. It will be appreciated that other SSTs may be connected to the network 205 and run respective Kubernetes workers.

The Kubernetes master 215 which runs on the server 210 includes an API server 216 that manages the Kubernetes cluster. The API server 216 records the state of the cluster based on information it receives from other internal components of the master 215 and interfaces with external components such as kubectl 212 and kubelets 231 respectively running on Kubernetes workers 230$_1$, 230$_2$. Etcd 217 is a distributed database for the Kubernetes cluster which stores information such as the configuration of the cluster. Etcd 217 also stores the desired state of the Kubernetes workers 230$_1$, 230$_2$ and the actual state of the Kubernetes workers 230$_1$, 230$_2$. A state may be understood as being an indication of the pods (e.g., Pod 3 235 on SST2 220$_2$) and their containers (e.g., container 236 in Pod 235) that are running on each Kubernetes worker (e.g., 230$_2$) in the cluster. A scheduler 218 monitors when new pods are to be run on a Kubernetes worker and then decides which Kubernetes worker on which to deploy them. A controller-manager 219 runs controller processes which attempt to move the actual state of the Kubernetes workers 230$_1$, 230$_2$ closer to the desired state specified on etcd 217. The master 215 also contains kubectl 212, a command-line tool for communicating with the Kubernetes cluster via the API server 216, and an operator interface 211.

Each Kubernetes worker 230$_1$, 230$_2$ located within the Kubernetes cluster runs on a respective SST. According to certain embodiments of the present invention, a worker 230 may run on a virtual machine of the SST. A worker 230 is able to communicate with other workers 230 and the master 215 through the network 205. Each worker 230 has a kubelet that manages the operation of the worker 230. The kubelet (e.g., kubelet 231 on SST 220$_2$) issues commands to the other components of the worker 230, monitors the pods running on the worker 230 (e.g., pod 235) and their containers (e.g., container 236), and communicates with the API server 216. The kubelet 231 receives deployment files and ensures that the containers 236 described in those deployment files are running and healthy. A kube-proxy, such as kube-proxy 232, is a network proxy which enables pods (whether in the same Kubernetes worker or a different worker) to communicate. A container engine (e.g., engine 233) runs and manages containers, and receives commands from the kubelet and container images from a registry. The container engine prepares container metadata which is passed on to a container runtime (e.g., container runtime 234) that is responsible for running the containers within the Kubernetes worker in which the container runtime is co-located.

The API server 216 of the Kubernetes master 215 deploys pods to Kubernetes workers. A pod commonly includes a single container, but can comprise multiple containers with similar functions, which would then share storage and network resources. A pod requests access to specific resources available to the worker through a kubelet (e.g., kubelet 231) and can communicate with other pods by using a kube-proxy (e.g., kube-proxy 232).

It will be appreciated that the server that executes the GUI application containers as described herein may be the same server 210 that comprises the Kubernetes master 215. Additionally, or alternatively, the server that executes the GUI application containers may be another server that is connected to the network and that runs a Kubernetes worker.

Figure 3:
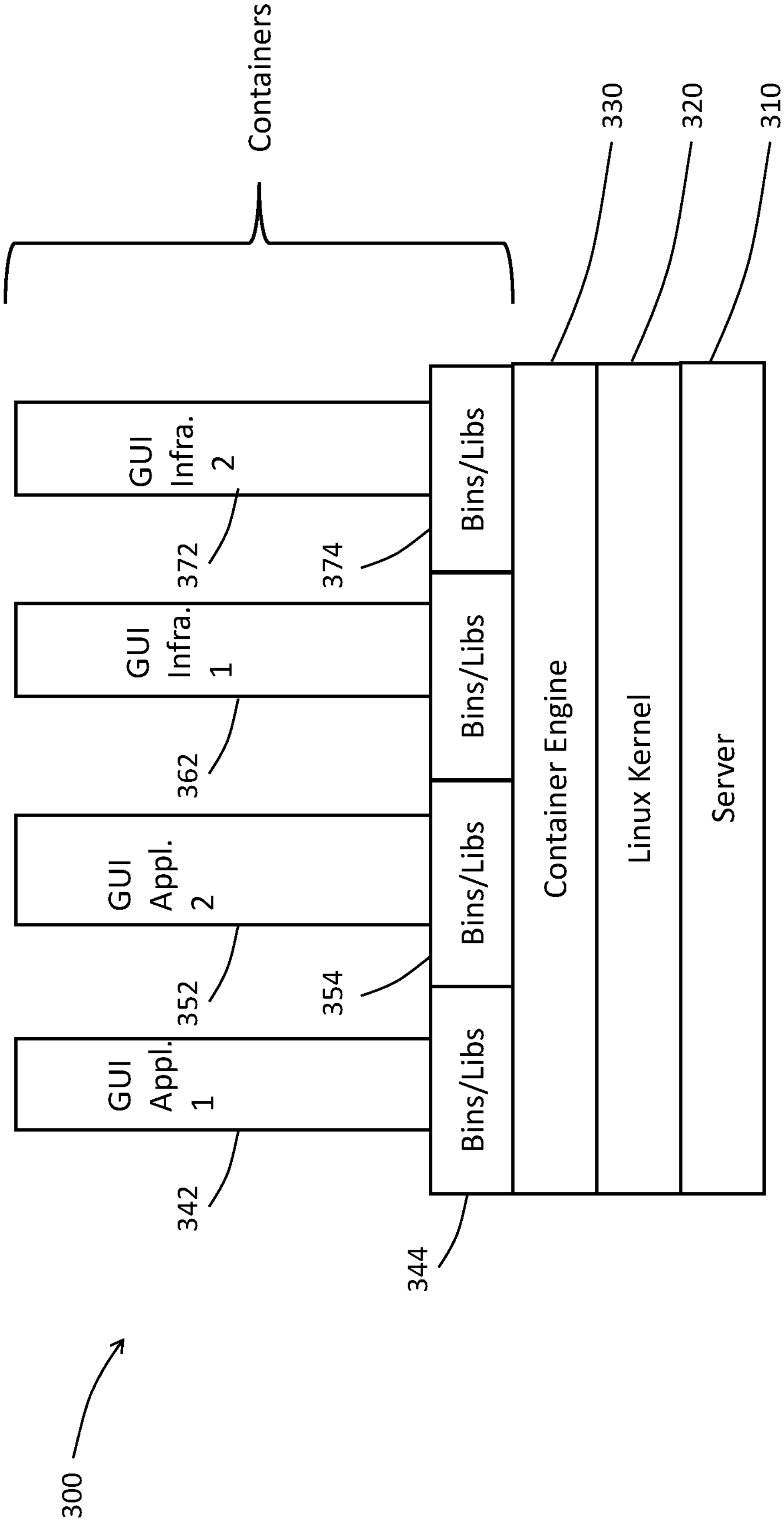
FIG. 3 illustrates a hardware and software architecture for a server that executes several software containers.

FIG. 3 illustrates a hardware and software architecture 300 for a server that is configured to execute several software container elements. In FIG. 3, the underlying hardware is a server 310. This may be one of the servers described with respect to FIG. 1 or FIG. 2. As described hereinabove, the server includes one or more processors and at least one memory. The memory stores executable software that is executable by the processors. The executable software includes a Linux kernel 320 which may be part of a Host Operating System (such as Unix or Ubuntu or the like). It will be appreciated that in certain other embodiments of the present invention other kernels and other host operating systems could be utilized (Windows, Mac etc.). Also included as part of the executable software is a container engine 330. The container engine is responsible for accepting user requests or requests from an API server of a container orchestrator (such as Kubernetes, Swarm, Mesos, or the like), pulling image files (in a particular image format) from a registry, preparing a container mount point, preparing metadata that is needed to execute a software container, and calling a container runtime. A container runtime (not shown) is a part of the container engine. The container runtime (such as runc, containerd, crun, railcar, katacontainers, or the like) uses the mount point and the metadata provided by the container engine and communicates with the Linux kernel 320 running on the computing device to execute several container image files and thereby create corresponding software containers. The executable image files for each of the software containers shown in FIG. 3 may be downloaded from a registry. In FIG. 3, three software container elements are illustrated. A first software container element 340 is referred to hereinafter as the GUI Application 1 container. The GUI Application 1 container includes application software 342 and associated binaries and libraries 344 (the binaries and libraries may be referred to as software dependencies). The application running in the GUI Application 1 container is a GUI Application that generates and provides a first graphical user interface on the display of a first SST connected to the server. A second software container element 350 is referred to hereinafter as the GUI Application 2 container. The GUI Application 2 container also includes application software 352 and associated binaries and libraries 354 (the binaries and libraries may be referred to as software dependencies). The application running in the GUI Application 2 container is a GUI Application that can generate and present a second graphical user interface on the display of a second SST connected to the server. Alternatively, GUI Application 1 and GUI Application 2 may provide respective GUIs to the same SST. The GUI Application 1 container and the GUI Application 2 container may execute at the same time or at different times. GUI Application 1 and GUI Application 2 may present the same, similar, or completely different GUIs. A third software container element 360 is referred to hereinafter as the GUI Infrastructure container 1. The GUI Infrastructure container 1 includes application software 362 and associated binaries and libraries 364 (the binaries and libraries may be referred to as software dependencies). The application running in the GUI Infrastructure container 1 includes software that manages the screen and input devices and is used by GUI Application 1. A fourth software container element 370 is referred to hereinafter as the GUI Infrastructure container 2. The GUI Infrastructure container 2 includes application software 372 and associated binaries and libraries 374 (the binaries and libraries may be referred to as software dependencies). The application running in the GUI Infrastructure container 2 includes software that manages the screen and input devices and is used by GUI Application 2. It will be appreciated that in other embodiments a single GUI infrastructure container may be responsible for multiple GUI application containers. It will also be appreciated that according to certain other embodiments of the present invention, the GUI Infrastructure software may not be contained within a software container but may operate outside a containerized environment. As can be seen in FIG. 3, each software container element has its own binaries and libraries (bins/libs). However, it will be appreciated that according to certain other embodiments of the present invention, any combination of containers could share bins/libs.

Figure 4:
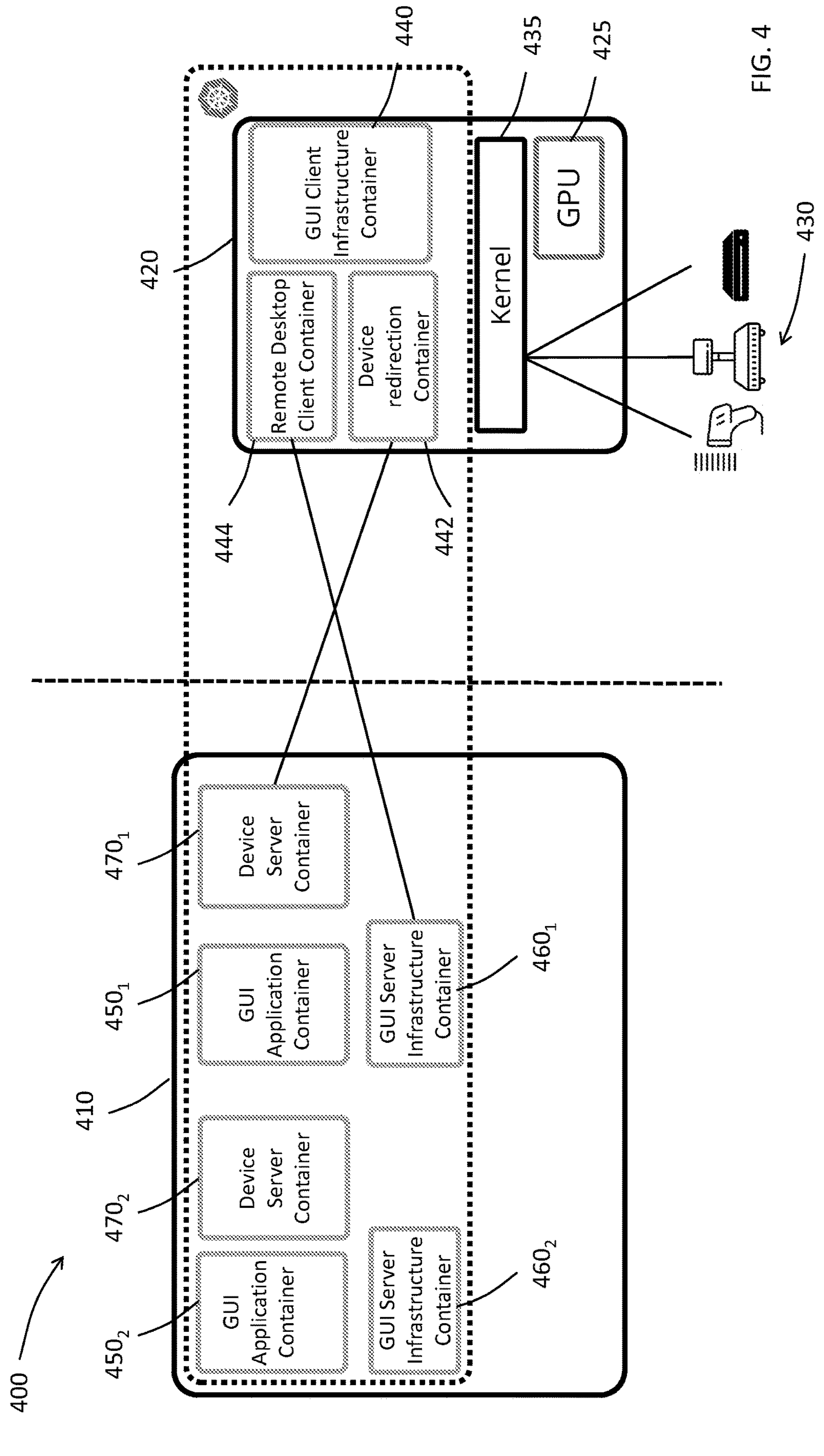
FIG. 4 illustrates a computing system in a retail environment, showing certain software container elements executing on a server and on a terminal.

FIG. 4 illustrates a computing system 400 in a retail environment including hardware and software components. The system 400 includes a server 410 in a back end of the store and a terminal 420 (which may be one of many terminals) in a front end of the store. The terminal may be an ultra-thin touchpoint running a thin client. The terminal may be referred to as a computing device. The terminal 420 includes, as hardware components, a graphical processing unit (GPU) 425 and one or more user input devices 430 (such as keyboard, touchscreen, mouse or the like). The GPU 425 is responsible for rendering the graphical user interface on the display (not shown) of the terminal. The user input devices enable a user to interact with the graphical user interface. The terminal includes a Linux kernel 435 as a software component. The Linux kernel 435 includes a direct rendering manager (not shown) and input drivers (not shown). The direct rendering manager is a component of Linux that allows applications to control the GPU. The input drivers are Linux device drivers for input devices such as those handled by xinput (explained below). Of course, according to certain other embodiments of the present invention, non-Linux based systems can be used and corresponding components can be used in such systems. Also, one or more display buffers (not shown) may be provided within the Linux kernel. The display buffers are regions of RAM on the terminal where bitmaps may be written before sending them to the GPU for display. These bitmaps may be written by providing display data from the server 410 to these display buffers (although this is not necessary in certain embodiments as described herein).

Also executing on the terminal (i.e., on one or more processors of the computing device) are three software container elements. A first software container element 440, a second software container element 442 and a third software container element 444. The first software container element 440 contains software associated with some limited GUI infrastructure components that may be needed on the terminal to support the display of a GUI on a display of the terminal when display data is received from the server 410. The second software container element 442 contains software that is configured to re-route data received from the user input devices 430 to the server 410. The user input devices may be connected via a USB or serial connection. The methodology for re-routing of peripheral device data is described in more detail below. The third software container element 444 contains software associated with a remote desktop client protocol, such as RDP or VNC or SPICE. This container receives the display data from the server 410 and causes the GUI to be displayed on the display of the terminal by providing the necessary commands to the GPU. This container also makes any input events from any peripheral devices connected to the SST (such as the user input devices 430, printers, scanners, indicator lights, or the like) available to the GUI infrastructure container running on the server so that the GUI can be updated in response to the input event. This container may likewise receive outputs from the GUI infrastructure container and direct these outputs to the connected peripheral devices. It will be appreciated that in certain other embodiments of the present invention the first, second, and third software container elements 440, 442, 444 described above need not be executed as software container elements.

On the server 410 (i.e., on one or more processors thereof) there also is executed multiple software container elements. There are shown two GUI application container elements 450$_1$, 450$_2$, two GUI infrastructure container elements 460$_1$, 460$_2$, and two device server container elements 470$_1$, 470$_2$. The GUI application containers contain a GUI application that is an end-user application with a user interface. The GUI infrastructure containers contain software that manages screens and input devices and is used by the GUI application to draw to a display. It will be appreciated that the two GUI application containers and associated infrastructure containers may provide separate GUIs to separate end terminals. Alternatively, they may provide different GUIs to the same end terminal. The contents of a GUI application container and a GUI infrastructure container are shown in more detail in FIG. 5. The device server containers 470$_1$, 470$_2$ contain an application that is responsible for controlling, configuring or otherwise accessing one or more of the peripheral devices connected to the terminal at a low level and exposing business level functions across the network to other components of the terminal. For example, the device server containers 470$_1$, 470$_2$ may talk via the device redirection container 442 to a scanner (low-level) and report scanned bar-codes (business level) to other components.

Figure 5:
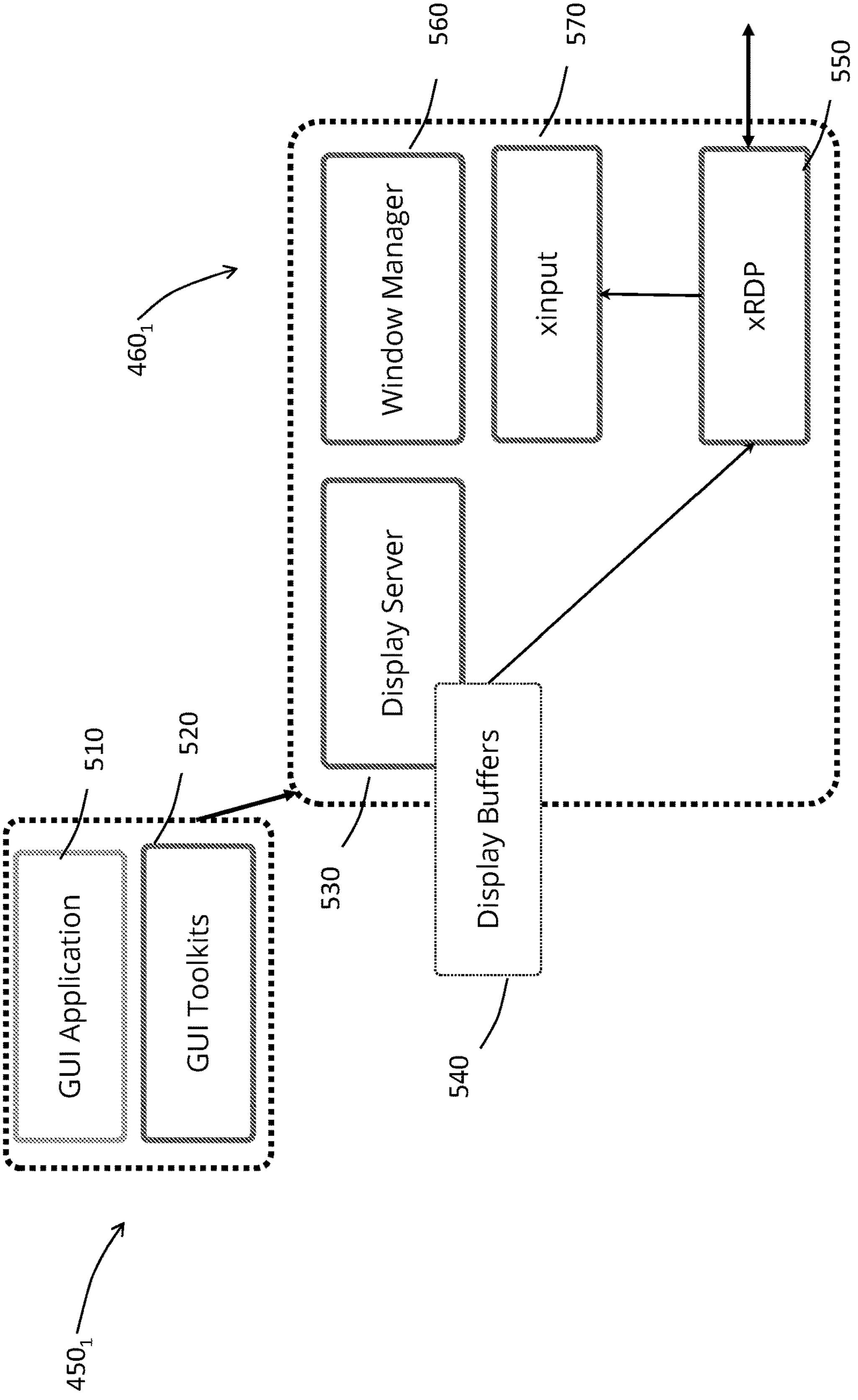
FIG. 5 illustrates the GUI application container and GUI infrastructure container of FIG. 4 in more detail.

Turning now to FIG. 5, the GUI application container 450$_1$ and GUI infrastructure container 460$_1$ are shown in further detail. The GUI application software container element 450$_1$ contains executable software associated with a GUI Application 510 (such as firefox, chrome, Spotify, a proprietary UI or the like). This container also contains executable software associated with one of more GUI toolkits 520 (such as Xlib, XCB, Open GL or the like). The GUI Toolkits are software, usually a shared library, that is used by the GUI Application to draw to the screen. As discussed above, the GUI application 510 is responsible for providing the graphical user interface (or the display instructions that cause the GUI to be displayed) that is to be rendered on the display of the computing device. The GUI Application 510 uses capabilities exposed by the display server 530 (explained below) to store display data in virtual display buffers 540 of the server 410. The display server (e.g., an Xvfb implementation of the Xorg or Wayland display server) co-ordinates the input and output of the GUI applications across the display and input hardware. For example, the GUI Application 510 can communicate with the GUI infrastructure container 460$_1$ and provide display instructions to this container. These instructions can be processed by the GUI infrastructure container 460$_1$ and provided to the virtual display buffer 540 (via the display server) so that display data is stored in the buffer. The virtual display buffer 540 is a region of RAM allocated by the display server 530 to which the GUI application can write bitmaps. The use of virtual display buffers 540 obviates, at least in part, the need for any graphics hardware to be present on the server. Once the display data is stored in the virtual display buffers, the remote desktop protocol (e.g., RDP or VNC or SPICE) server 550 also executing within the GUI infrastructure container reads the display data (i.e., visual information) from the buffers and makes this data available to a corresponding remote desktop protocol client (e.g., the container 444 of FIG. 4) on the terminal. Once received at this container, the display data can be processed and sent to the GPU on the terminal for causing the GUI to be displayed thereon. One or more of the container elements shown in FIGS. 4 and 5 may be provided by executing executable image files (not shown) on the processor(s) of the server or computing device as needed. As an example, the image file associated with the GUI application may include the executable software that defines the GUI application and the executable software that defines the GUI Toolkits. It will also be appreciated that all software container elements may form part of the same Kubernetes cluster (shown by the dotted line in FIG. 4).

Also included within the GUI Infrastructure container 460$_1$ (and thus image file) is software associated with a window manager 560 and an xinput module 570. The Window Manager 560 controls the placement and appearance of windows containing GUIs on the display (e.g., whether they are minimized, maximized, and the size and/or position of the window). The Window Manager 560 may be an Openbox Window Manager or the like. The xinput module 570 or subsystem handles input devices such mice, keyboards and touchscreens. While the GUI infrastructure is shown in a software container element, according to certain other embodiments of the present invention, the GUI infrastructure need not be provided in a software container. When a user interacts with the terminal via a user input device, this is detected via the xinput module 570 (which receives commands from the user input devices following device redirection as described hereinbelow). These commands are then transmitted from the GUI infrastructure container 460$_1$ to the GUI application container 450$_1$ whereupon the GUI application can make necessary modifications to the GUI based on the input commands. The GUI application does this by sending updated display instructions to the display server that updates the display data in the virtual display buffers, which is then provided to the GPU on the terminal. The GUI infrastructure container 460$_1$ can mount one or more communication socket addresses (e.g., an Xorg socket) into the GUI Application container 450$_1$ to expose capabilities of the GUI infrastructure to the overlying GUI applications.

It will now be appreciated how certain embodiments of the present invention execute a GUI application of a retail application inside a container and provide a containerized 'desktop' infrastructure that includes a local virtual frame buffer (VFB) (i.e., the virtual display buffers). The GUI application renders to the VFB and it is the contents of the VFB that are rendered on the terminal using VDI technologies like RDP, VNC or SPICE.

Figure 6:
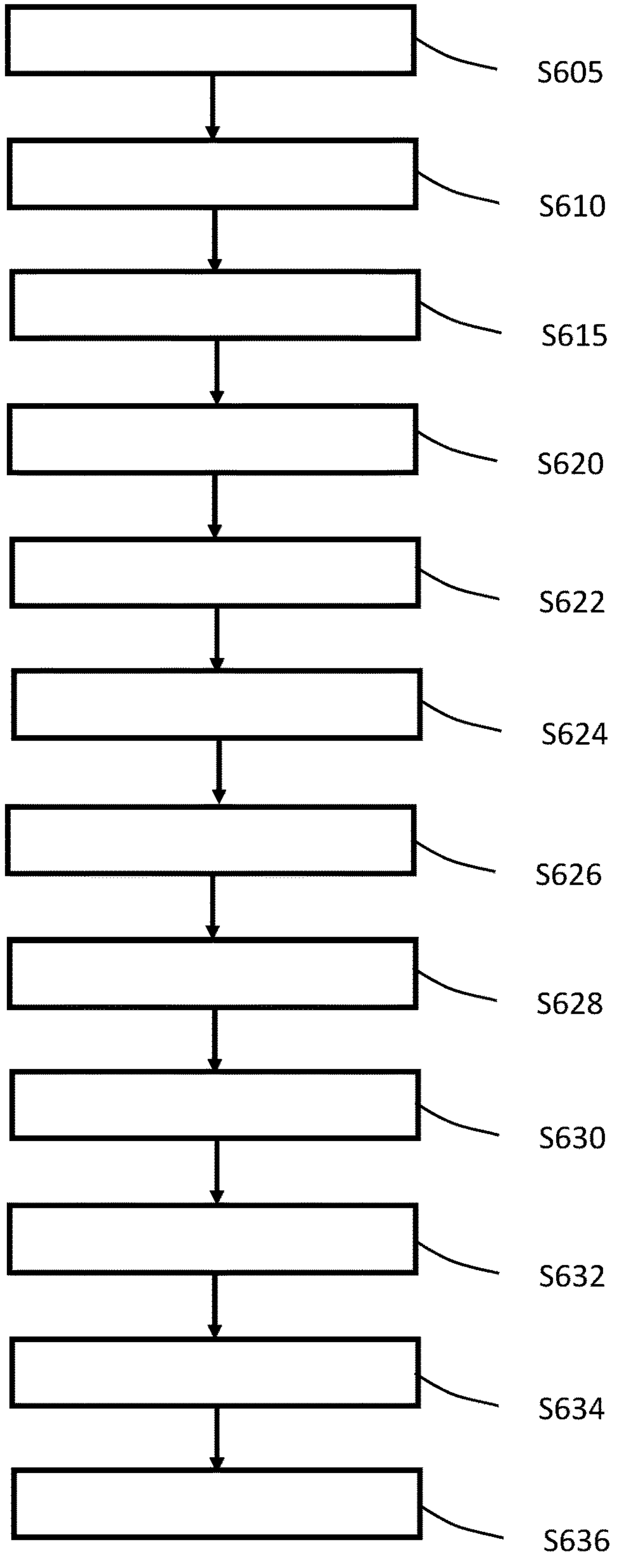
FIG. 6 illustrates a flow chart describing certain steps taken for executing a GUI application in a software container.

FIG. 6 illustrates a flow chart of certain steps 600 that take place during the assembly and running of a GUI application in a container environment on a server, which is then displayed on an SST. The server may be any of the servers illustrated in the preceding Figures (e.g., server 400). The server contains a Kubernetes master instance and a Kubernetes worker client. The Kubernetes master instance may be configured as described in FIG. 2. The Kubernetes worker client is running a GUI server infrastructure container. The GUI server infrastructure container may be the GUI infrastructure element 460. The GUI server infrastructure container is responsible for facilitating GUI Applications to run on the server, for forwarding display information data to the SST, and for receiving device input data from the SST. The SST may be any of the SSTs illustrated in the preceding Figures (e.g., the terminal 420). When the SST is initially deployed, the necessary software including a Linux kernel, Kubernetes worker distribution, and the like is installed. It will be appreciated that sometimes a different kernel (host OS) may be used. It will be appreciated that in some examples, any containerization software may be used.

At step S605, the pre-configured SST is powered on. This occurs for example when the SST is first used that day, such as when a supermarket with SSTs opens for business. The software on the SST, including the host OS and the Kubernetes worker configuration is then loaded from the memory of the SST and executed by processors of the SST. In some embodiments, at this stage, the GUI infrastructure will be loaded from the memory of the SST and executed by the processors of the SST outside of the Kubernetes worker configuration. Thereafter, at step S610, a controller-manager of the Kubernetes master detects a difference between pods that are expected to be executing on a Kubernetes worker associated with the SST as specified according to the etcd database and the pods that are actually executing on the SST. The available resources on the Kubernetes worker will also be checked to determine that the resources required by a pod are available on the Kubernetes worker. Responsive to detecting that one or more pods that should be executing on the SST are not, and that suitable resources are available, the API server of the Kubernetes master sends information to a kubelet on the SST to resolve this inconsistency. This information includes a deployment file for each pod that is to be executed on the SST. It will be appreciated that according to certain other embodiments of the present invention that do not use the Kubernetes orchestration platform, containers may be executed without the need for being run within pods (which are a particular feature of the Kubernetes system).

At step S615, the kubelet of the Kubernetes worker receives the information from the API server and initializes a corresponding Pod on the Kubernetes worker. At step S615, the Kubernetes worker receives various deployment files. A first deployment file details the configuration, including executable image file, resource requirements and the like of a Pod containing a GUI client infrastructure container. The GUI client infrastructure container may correspond to the first software container element 440. The GUI client infrastructure container includes software components required to manage the screen and input devices based on instructions received from the server. It will be appreciated that in other embodiments, the GUI client infrastructure may be installed directly on the kernel instead of installing the GUI client infrastructure in a container. In other words, sometimes the GUI client infrastructure may not be implemented via containerization. A second deployment file details the configuration, including executable image file, resource requirements and the like of a Pod containing a device redirection container. The device redirection container may correspond to the second software container element 442. The device redirection container is responsible for forwarding data received from devices connected to the SST on to the server. A third deployment file details the configuration, including executable image file, resource requirements and the like of a Pod containing a remote desktop client container. The remote desktop client container may correspond to the third software container element 444. The remote desktop client container receives visual information from the server and sends the visual information to the GUI client infrastructure container. It will be appreciated that any number of deployment files may be received by the SST from the Kubernetes master. By changing the deployment files sent to the SST, it is possible to quickly update software elements running on the SST. Steps S620 to S628 describe the stages of building and initializing a GUI application container on the server to be displayed on the SST. It will be appreciated that any number of GUI application containers may be built and initialized on the server. At step S620, dependencies of the GUI application are identified. At step S621, a container image (docker compose YAML file) is created. It will be appreciated that in other embodiments, the docker compose YAML file may be replaced by any standardized application definition file. The container image includes a base OS image, any dependencies, and the required GUI application. The container image may be saved as a GUI Application Container Image, forming part of a GUI Application Custom Resource Definition (CRD) in the Kubernetes master, for recall at a later date.

At step S622, a monitoring component running on the SST (touchpoint) determines that a new GUI application is needed and thus that a new GUI Application needs to be started on the server to be displayed on the SST. This could occur, for example, due to a customer interacting with the SST, the selection of an application icon, an automated process, or the like. The requirement for a new GUI Application is communicated through the Kubernetes cluster to a monitor component on the server. The monitor component then creates, at step S624, a new GUI Application Instance CRD linking a GUI Application CRD to the server. The GUI Application Instance CRD records whether the GUI Application is active. While the GUI Application Instance CRD records the GUI application as active, the GUI application-which is executed on the server—is interactable through hardware inputs received from the device redirection container on the SST. Thereafter, at step S626, a GUI Controller detects the creation of the new GUI Application Instance CRD and creates the appropriate Pod spec in the Kubernetes API server to permit the GUI application defined in the GUI Application CRD to be started on the server. This involves creating a deployment file. The deployment file (Pod spec) includes the container image created in step S621, resource requirements, an Xvfb server socket, storage mounts, and the like. In some embodiments, the Xvfb server socket may be a different display server protocol.

At step S628, the deployment file created at step S626 is sent, via the API-server of the Kubernetes master, to the kubelet of the server specified in the deployment file. At step S630, a GUI application Pod is created on the server. The GUI application Pod contains the GUI Application container and GUI toolkits. Display frames from the GUI Application are rendered using Xvfb without using graphics hardware and are stored on virtual display buffers associated with Xvfb. The display data in the display buffer is transferred, via xRDP in the GUI Server Infrastructure Container on the server, to the Remote Desktop Client Container on the SST. Through the kernel, the display frames of the virtual display buffer are displayed on the display of the SST. This is achieved by the display data being passed to the kernel and then sent to a Graphical Processing Unit. Device inputs received through the kernel from physical devices connected to the SST are forwarded via the Device Redirection Container to xinput through xRDP on the server to enable control of the GUI Application on the server. Therefore, inputs from devices on the SST are able to influence GUI Applications running on the server. It will also be appreciated that device inputs may be sent to other container(s) on the server (such as the device server container), which may assist in controlling operation of the devices.

At some point after step S630, at step S632, a predetermined event causes the monitor component to detect that another GUI application is required. In response, at step S634, a new GUI Application Instance CRD is created linking a GUI Application CRD to the server. It will be appreciated that the predetermined event may include hardware inputs, software commands, or the like. Following creation of the new GUI Application Instance CRD, the active GUI application described in steps S620 to S630 may be moved to the background and a previously background GUI application be made active. That is to say that in some instances, the required GUI application may already be running in a GUI application pod on the server. Accordingly, the newly created GUI App Instance CRD may be an updated GUI App Instance CRD where the required GUI application is recorded as being active. In this case, the GUI App Instance CRD for the previously active GUI application may be updated to be recorded as background. This change in status will be reported to a window manager of the GUI infrastructure container on the server, which will make the required GUI application visible and interactable through hardware inputs via xinput received from the device redirection container on the SST. It will be appreciated that if there is no previously background GUI application container running, then the GUI Controller may, at step S636, detect the creation of the new GUI Application Instance CRD and create the appropriate Pod spec in the Kubernetes API server in order for the GUI application defined in the GUI Application CRD to be started on the server. It will also be appreciated that instead of moving the active GUI application to a background, it may instead be terminated or the position, size and/or minimized status of the GUI application may be controlled. It will be appreciated that during operation, display frames will be rendered in the virtual display buffer on the server and forwarded to the SST.

FIG. 6 demonstrates how the self-service terminal (SST) may be configured as the Kubernetes worker, how GUI Applications may run on the server and display data associated with display frames in a virtual frame buffer may be forwarded to the SST. Further, FIG. 6 demonstrates how the SST includes the GUI client infrastructure container, the Remote Desktop Client container, the Device redirection container, and the like. FIG. 6 also demonstrates how the server includes GUI Application Instance CRDs, GUI application containers, Device Server containers, GUI Server Infrastructure containers, GUI Application Container Images, the GUI controller, and the like. It will be appreciated that in some embodiments, the SST may be any computing device capable of being a Kubernetes worker. In some embodiments, an alternative container orchestration system to Kubernetes may be used. In other embodiments, any number of GUI application pods containing GUI applications may be running on the server. It will be appreciated that the server could be multiple servers. It will be also appreciated that the server may not run a Kubernetes master. In some embodiments, there may be no predetermined events.

To enable peripheral devices of a terminal, such as scanners and pinpads, to be assessed and controlled by a retail application, the retail devices should be connected over a network to the retail application containers. For devices that natively support IP networking such as IP cameras, this is straightforward. However, in the case of USB and serial devices, a specific mechanism is needed. This mechanism is illustrated in FIGS. 7 and 8, according to example embodiments of the disclosed technology.

Figure 7:
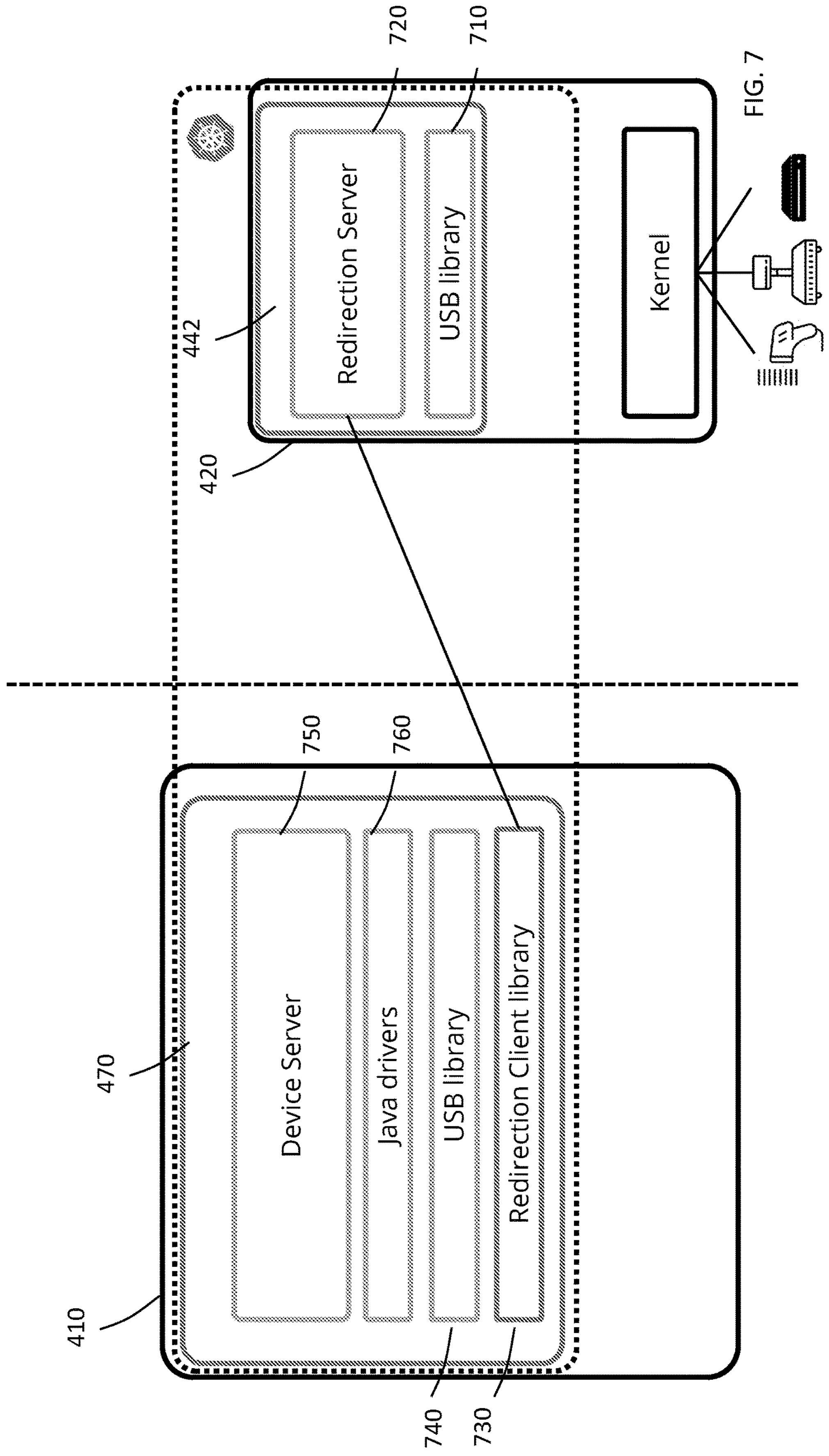
FIG. 7 illustrates a computing system showing a device redirection methodology for USB devices.

FIG. 7 shows an example of the device redirection methodology between the redirection server container 442 and device server container 470 shown in FIG. 4 in more detail. The example shown in FIG. 7 assumes the user input devices 430 are connected via USB connections. It will be appreciated, however, that any retail peripheral device (e.g., printers, scanners, indicator lights, or the like) may be connected via a USB connection to the SST. As can be seen, the device redirection server container 442 includes a USB library 710 and a redirection server 720. The USB library 710 is a library used in Linux or Windows to interact with USB devices, which obviates the need to talk to the OS USB layer directly. Typically, the USB library interoperates with the USB kernel drivers to communicate with USB hardware. However, in FIG. 7, instead of communicating with the kernel USB layer, the USB library works in conjunction with the redirection server to communicate with a redirection client library 730 located in the device server container 470. The device redirection client library 730 works with the redirection server 720 to convey USB commands from the USB library 710 and the USB library 740 over the network to and from the physical USB hardware on the terminal as needed. The USB commands from the peripheral devices 430 can thus be directed into the appropriate software container running on the server 410. For example, USB commands from the peripheral devices connected to the terminal can be re-routed via the redirection server 720 to the device server container 470 (via the redirection server 720 communicating with the redirection client library 730) and then provided into the device server application 750 which processes the commands. Also, when commands need to be sent in the opposite direction, the device server application 750 can send these commands to the redirection server 720 on the terminal (via the redirection client library 730) which then sends the commands to the relevant connected USB device. Also, within the device server container 470, are one or more Java drivers 760 which enable the device server application 750 (which is Java-based) to interact with the USB library 740 and redirection client library 730. Of course, when the device server application 750 is non-Java-based these drivers are not needed and other drivers may be utilized.

Figure 8:
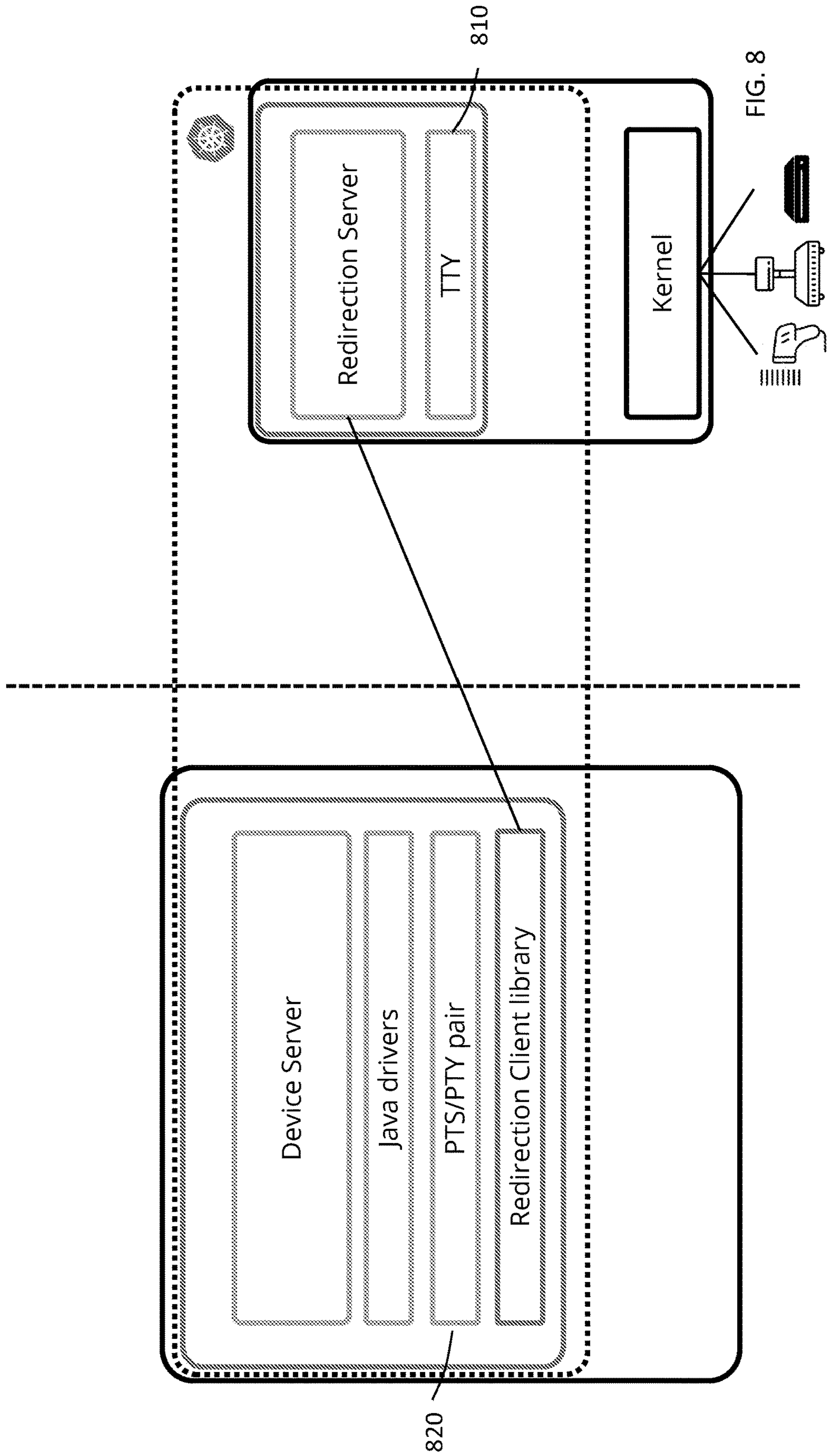
FIG. 8 illustrates a computing system showing a device redirection methodology for serial devices.

If serial devices are utilized instead of USB devices, the architecture shown in FIG. 8 may be used. FIG. 8 is similar to FIG. 7 with the exception that the libraries used are different. For example, instead of USB library 710, a Teletype (TTY) module 810 is provided. This module is a library of all kinds of physical serial devices that could be connected. A single TTY may refer to a single serial device. Furthermore, instead of USB Library 740, a collection of pseudo terminal device pairs (PTS/PTY pairs) are stored within the device server container. These pairs provide a mechanism to create 'pretend' (i.e., pseudo) devices and make them available for other applications to use. Still further, instead of the USB redirection protocols used by the redirection server 720 and redirection client library 730 in FIG. 7, in FIG. 8 a 'socat' tool is used to communicate between these two entities. This tool enables reading and writing between TTYs, PTS/PTY pairs, and across the network. By using socat on both the server and the terminal, serial data from a physical TTY connected to the terminal can be made to appear from a PTY on the server. Essentially, a serial device connected over the network can forward its data to a pseudo-terminal pair inside the device server container. A Java driver (or non-Java driver if needed) inside the container can then open one end of the pseudo-terminal pair and expose this end to the device server application as if it was a physical serial port.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Although the present disclosure has been particularly shown and described with reference to the particular embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

I claim:

1. A computer-implemented method for providing a graphical user interface on a display of a computing device, the method comprising:

providing a first executable image file comprising first executable software associated with a graphical user interface application;

executing the first executable image file as a first software container element that contains the first executable software and that is executed on one or more processors of a server that is remote from a computing device to generate display data associated with a graphical user interface of the computing device;

transmitting the display data to the computing device;

generating the graphical user interface at the computing device based on the display data from the server and graphical user interface infrastructure components that are stored within a software container element at the computing device and are not provided by the server with the display data, wherein the graphical user interface infrastructure components are executed at the computing device to generate at least a portion of the graphical user interface independently of the server; and providing the graphical user interface on a display of the computing device.

2. The method of claim 1, further comprising:

providing a second executable image file comprising second executable software associated with graphical user interface infrastructure components that support the graphical user interface application; and executing the second executable image file as a second software container element that contains the second executable software and that is executable on the one or more processors of the server.

3. The method of claim 2, further comprising:

responsive to executing the first executable image file, providing display instructions from the first software container element to a display buffer associated with the second software container element; and responsive to providing the display instructions, storing the display data in the display buffer.

4. The method of claim 3, wherein providing the second executable image file comprises providing the second executable image file as an image file that comprises executable software associated with a display server, whereby the display server is configured to receive and send the display instructions to the display buffer.

5. The method as claimed in claim 2, wherein providing the second executable image file comprises providing the second executable image file as an image file that comprises executable software associated with a remote desktop protocol server, whereby the remote desktop protocol server is configured to transmit the display data to the computing device and/or receive data associated with inputs from one or more user input devices connected to the computing device.

6. The method as claimed in claim 2, further comprising:

providing the second executable image file comprises providing the second executable image file as an image file that comprises executable software associated with a user interface input manager, whereby the user interface input manager is configured to process inputs received from one or more user input devices connected to the computing device.

7. The method of claim 2, further comprising:

providing a third executable image file comprising third executable software configured to re-route data received from one or more user input devices connected to the computing device; and executing the third executable image file as a third software container element that contains the third executable software and that is executable on the one or more processors of the computing device.

8. The method of claim 7, further comprising:

via the third software container element, re-routing data received from the one or more user input devices to the server, wherein at least one of the one or more user input devices is a peripheral device connected to the computing device via a USB or serial connection.

9. The method of claim 8, further comprising:

receiving the re-routed data at the second software container element;

transmitting the re-routed data from the second software container element to the first software container element; and responsive to transmitting the re-routed data from the second software container element to the first software container element, providing updated display instructions from the first software container element to the second software container element to cause the graphical user interface to be updated.

10. The method of claim 8, wherein re-routing the data received from the one or more user input devices comprises re-routing the data via a remote desktop protocol.

11. The method of claim 1, further comprising:

transmitting the display data to a graphical processing unit located on the computing device; and responsive to the graphical processing unit processing the display data, providing the graphical user interface on the display.

12. The method of claim 1, further comprising:

transmitting the display data to the computing device via a remote desktop protocol.

13. The method of claim 1, further comprising:

providing the first executable image file as an image file that comprises executable software associated with the graphical user interface application and one or more graphical user interface toolkits.

14. The method of claim 1, further comprising:

providing a plurality of first executable image files, each comprising respective first executable software associated with a respective graphical user interface application;

executing each of the plurality of first executable image files as a plurality of respective first software container elements that respectively contain the respective first executable software and that are executable on the one or more processors of the server that is remote from a plurality of computing devices;

transmitting respective display data associated with a respective graphical user interface to each respective computing device of the plurality of computing devices; and providing the respective graphical user interface on each respective display of each respective computing device.

15. The method of claim 14, further comprising:

providing a plurality of second executable image files, each comprising respective second executable software associated with respective graphical user interface infrastructure components that support a respective graphical user interface application; and executing each of the plurality of the respective second executable image files as respective second software container elements that respectively contain the respective second executable software and that are executable on said one or more processors of the server.

16. A computing system comprising:

at least one computing device comprising a display for providing a graphical user interface and a server remote from the computing device, the server comprising one or more processors configured to:

execute a first executable image file comprising first executable software associated with a graphical user interface application, as a first software container element that contains the first executable software, to generate display data associated with a graphical user interface of the computing device; and transmit the display data to the computing device;

wherein the computing device comprises one or more processors configured to:

receive the display data from the server;

generate the graphical user interface at the computing device based on the display data received from the server and graphical user interface infrastructure components that are stored within a software container element at the computing device and are not provided by the server with the display data, wherein the graphical user interface infrastructure components are executed at the computing device to generate at least a portion of the graphical user interface independently of the server; and provide the graphical user interface on the display of the computing device.

17. The computing system of claim 16, wherein the computing device is a point of sale terminal or self-service terminal or kiosk.

18. The computing system of claim 16, wherein the one or more processors of the server are further configured to:

execute a second executable image file comprising second executable software associated with graphical user interface infrastructure components that support the graphical user interface application, as a second software container element that contains the second executable software.

* * * * *